US006819857B2

(12) United States Patent
Douglas et al.

(10) Patent No.: US 6,819,857 B2
(45) Date of Patent: Nov. 16, 2004

(54) ROTATING VERTICAL FIBER TRAY AND METHODS

(75) Inventors: Joel B. Douglas, Hutchinson, MN (US); John T. Van Scoy, Shakopee, MN (US); Lonnie E. Hannah, Monticello, MN (US); Wayne John Giesen, Waconia, MN (US); Curtis Lee Puetz, Apple Valley, MN (US); Trevor D. Smith, St. Louis Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/977,072

(22) Filed: Oct. 12, 2001

(65) Prior Publication Data

US 2003/0072551 A1 Apr. 17, 2003

(51) Int. Cl.⁷ .................................................. G02B 6/00
(52) U.S. Cl. ...................................... 385/135; 385/134
(58) Field of Search ............................... 385/135, 134, 385/136, 137, 147

(56) References Cited

U.S. PATENT DOCUMENTS

| | | | |
|---|---|---|---|
| 4,502,754 A | 3/1985 | Kawa | 385/134 |
| 4,595,255 A | 6/1986 | Bhatt et al. | 385/135 |
| 4,630,886 A | 12/1986 | Lauriello et al. | 385/135 |
| 4,717,231 A | 1/1988 | Dewez et al. | 385/135 |
| 4,765,710 A | 8/1988 | Burmeister et al. | 385/134 |
| 4,776,662 A | 10/1988 | Valleix | 385/137 |
| 4,792,203 A | 12/1988 | Nelson et al. | 385/135 |
| 4,824,196 A | 4/1989 | Bylander | 385/134 |
| 4,900,123 A | 2/1990 | Barlow et al. | 385/53 |
| 4,995,688 A | 2/1991 | Anton et al. | 385/53 |
| 5,066,149 A | 11/1991 | Wheeler et al. | 385/135 |
| 5,074,635 A | 12/1991 | Justice et al. | 385/95 |
| 5,093,885 A | 3/1992 | Anton | 385/134 |
| 5,100,221 A | 3/1992 | Carney et al. | 385/135 |
| 5,115,489 A | 5/1992 | Norris | 385/135 |
| 5,129,030 A | 7/1992 | Petrunia | 385/135 |

(List continued on next page.)

FOREIGN PATENT DOCUMENTS

| | | |
|---|---|---|
| AU | 40995/85 | 10/1985 |
| AU | 8655314 A1 | 10/1986 |
| DE | 2735106 | 2/1979 |
| DE | 3308682 | 9/1984 |
| EP | 146478 | 6/1985 |
| EP | 149250 | 7/1985 |
| EP | 196102 | 10/1986 |
| EP | 406151 | 1/1991 |
| EP | 479226 | 4/1992 |
| EP | 196102 B1 | 3/1993 |
| EP | 538164 | 4/1993 |
| FR | 2531576 | 2/1984 |
| FR | 2 694 642 A1 | 2/1994 |
| JP | 59-74523 | 4/1984 |
| JP | 60-169811 | 9/1985 |
| JP | 61-55607 | 6/1994 |
| JP | 61-90104 | 7/1994 |
| WO | WO 95/07480 | 3/1995 |
| WO | WO 9610203 | 4/1996 |
| WO | WO 99/47960 | 9/1999 |

Primary Examiner—Thong Nguyen
Assistant Examiner—Arnel C. Lavarias
(74) Attorney, Agent, or Firm—Merchant & Gould P.C.

(57) ABSTRACT

A storage tray arrangement for storing cable slack in fiber optic systems includes a vertically oriented frame and at least one tray mounted to the frame in a vertical plane parallel to the frame. There is a mounting construction that permits the tray to be pivotally secured to the frame. The mounting construction permits the tray to be selectively pivoted relative to the frame within the vertical plane. In preferred arrangements, the trays are mounted as tray sets having at least two trays mounted to a common pivot post. Particular preferred trays include trays having scalloped side walls. Methods for storing cable slack utilize trays and mounting arrangements as described herein.

30 Claims, 9 Drawing Sheets

U.S. PATENT DOCUMENTS

| | | |
|---|---|---|
| 5,138,689 A | 8/1992 | Merlo et al. ................ 385/135 |
| 5,142,606 A | 8/1992 | Carney et al. .............. 385/134 |
| 5,167,001 A | 11/1992 | Debortoli et al. ........... 385/135 |
| 5,208,894 A | 5/1993 | Johnson et al. ............. 385/135 |
| 5,247,603 A | 9/1993 | Vidacovich et al. ........ 385/135 |
| 5,249,252 A | 9/1993 | Noto .......................... 385/135 |
| 5,353,367 A | 10/1994 | Czosnowski et al. ....... 385/135 |
| 5,402,515 A * | 3/1995 | Vidacovich et al. ........ 385/135 |
| RE34,955 E | 5/1995 | Anton et al. .................. 385/53 |
| 5,511,144 A | 4/1996 | Hawkins et al. ............ 385/135 |
| 5,519,804 A | 5/1996 | Burek et al. ................. 385/135 |
| 5,613,030 A | 3/1997 | Hoffer et al. ............... 385/135 |
| 5,850,925 A | 12/1998 | Gandre ......................... 211/26 |
| 5,917,984 A | 6/1999 | Roseler et al. .............. 385/135 |
| 5,946,440 A | 8/1999 | Puetz .......................... 385/135 |
| 5,987,207 A | 11/1999 | Hoke .......................... 385/135 |
| 6,082,815 A * | 7/2000 | Xiromeritis et al. ........ 297/124 |
| 6,263,141 B1 | 7/2001 | Smith ......................... 385/135 |
| 6,453,107 B1 * | 9/2002 | Daoud ........................ 385/135 |
| 2002/0131749 A1 * | 9/2002 | Swenson et al. ............ 385/135 |

\* cited by examiner

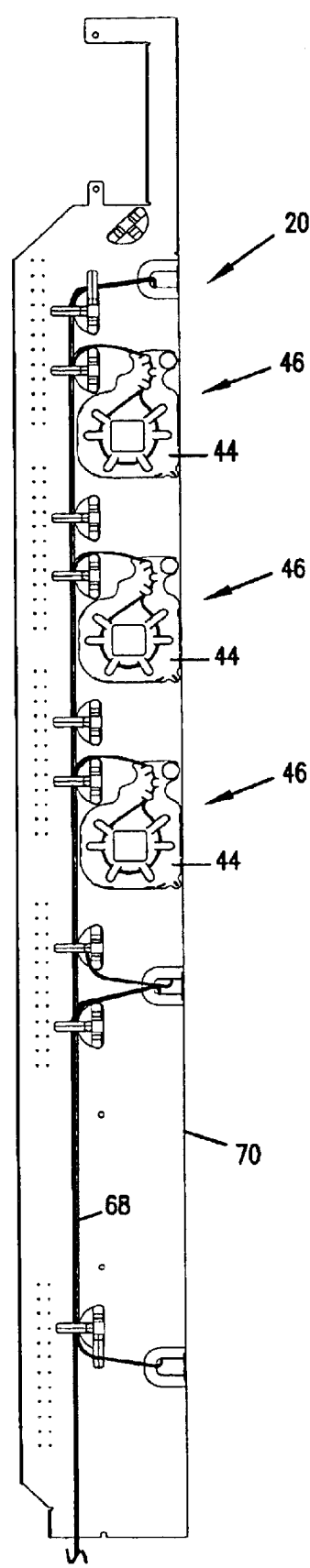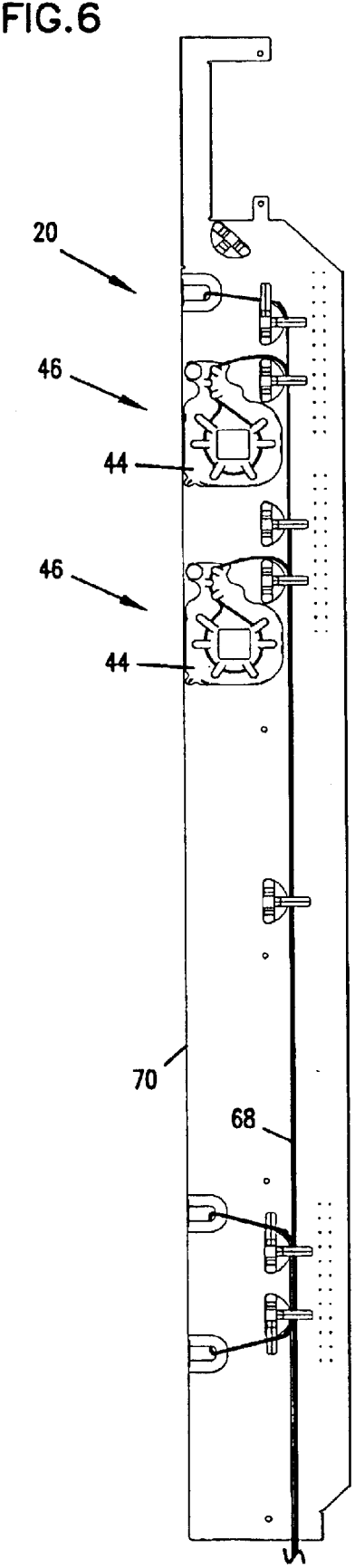

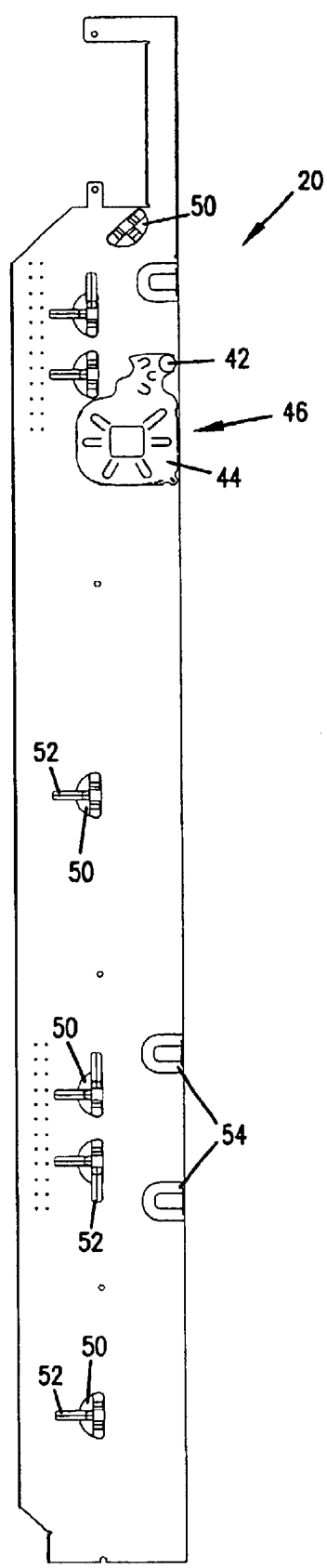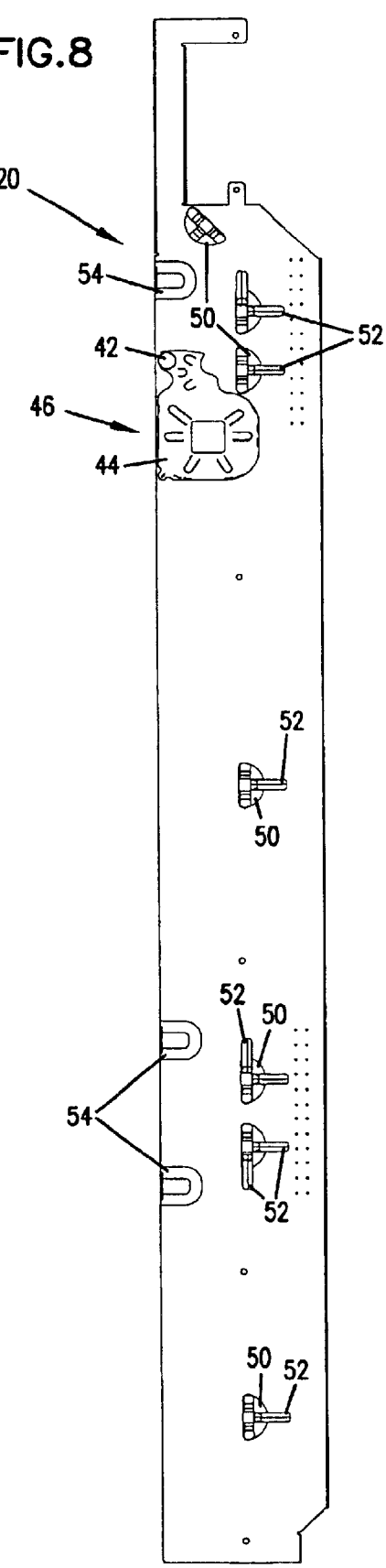

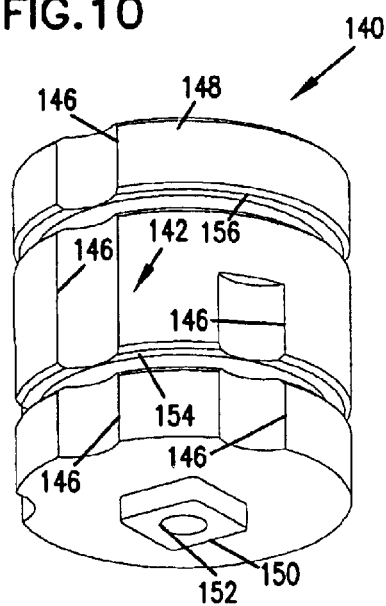
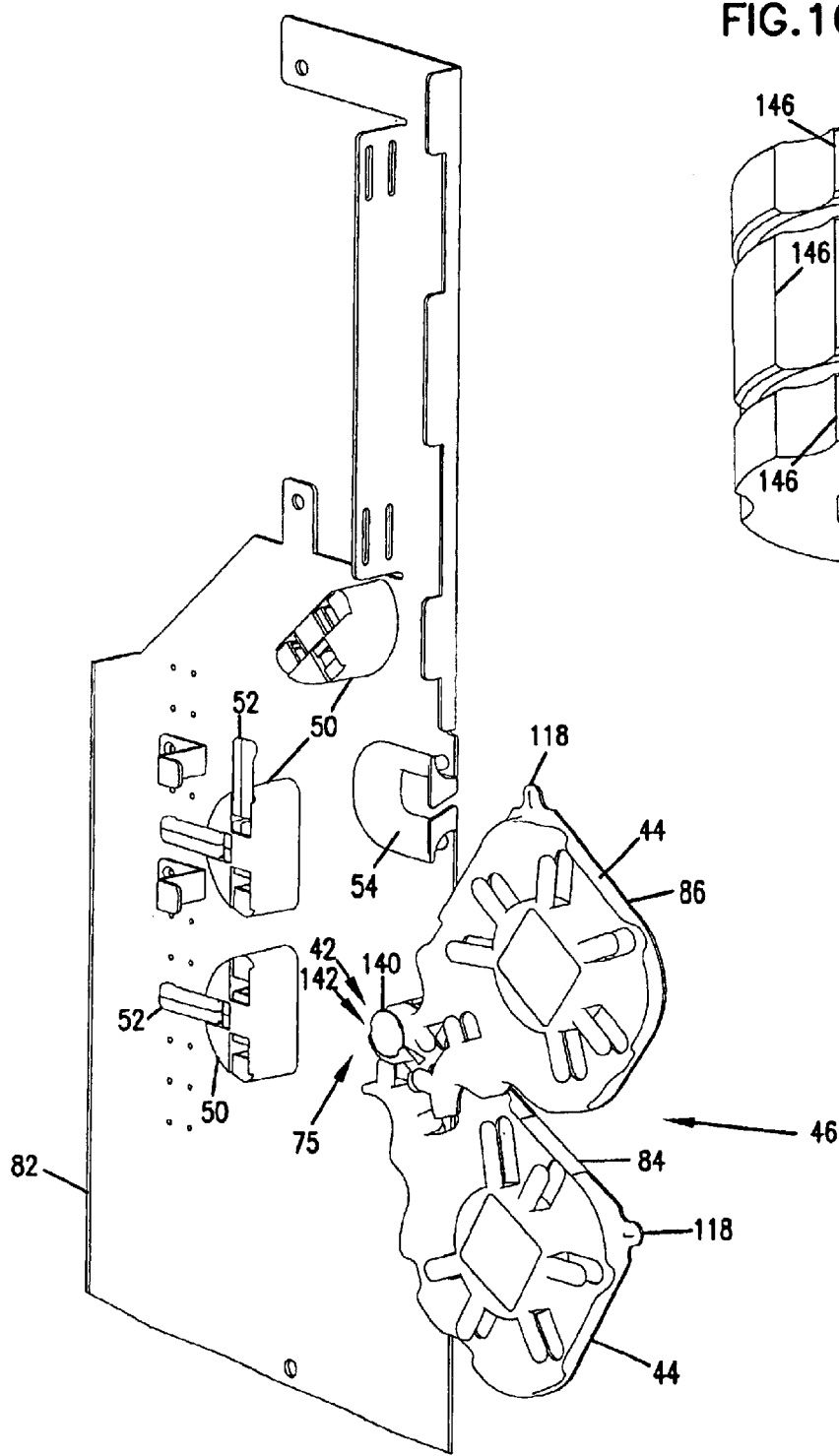

ROTATING VERTICAL FIBER TRAY AND METHODS

TECHNICAL FIELD

This disclosure is concerned with management of telecommunication cables, including optical fiber cables. In particular, this disclosure has application in the telecommunications industry with respect to storing excess cable lengths.

BACKGROUND

Cable storage devices are known including, for example, a device shown in U.S. Pat. No. 4,792,203 assigned to ADC Telecommunications, Inc., the assignee of this disclosure. The device of U.S. Pat. No. 4,792,203 includes various features for organizing fiber optic cables. The '203 patent includes a description of spools shaped to control the bend radii of the fibers so that the minimum bend radii is not exceeded. Storing excess lengths of fibers, organizing them, and protecting them from damage are desirable features. There is a continued need in the art for further management devices that address concerns in the telecommunications industry such as ease of use, size, reliability, cost, and protection of the fibers.

SUMMARY OF THE DISCLOSURE

In one aspect, the disclosure describes a storage tray arrangement for storing cable slack. One preferred embodiment of the tray arrangement includes a frame that is oriented in a vertical first plane; a first tray mounted to the frame in a vertical second plane parallel to the first plane; and a mounting construction pivotally securing the first tray to the frame. Preferably, the first tray includes a cable entry region, a base, and a spool projecting from the base. Preferably, the mounting construction permits the first tray to be selectively pivoted relative to the frame within the second plane.

In another aspect, the disclosure describes a storage tray for storing cable slack, wherein the tray includes a base defining a storage region and a cable entry region, a side wall projecting from the base and extending along the perimeter of the base, a spool in the storage region projecting from the base, a first plurality of tabs, and a second plurality of tabs. Preferably, the side wall defines a plurality of scallops. Preferably, the first plurality of tabs extends from the spool toward the side wall in the storage region, and the second plurality of tabs extends from the side wall and over a trough in the cable entry region.

In another aspect, a storage tray for storing cable slack is provided that includes a base defining a storage region and a cable entry region, a side wall projecting from the base and extending along a perimeter of the base, a detent protruding from the side wall, a spool in the storage region projecting from the base, a first plurality of tabs, and a second plurality of tabs. Preferably, the side wall includes first and second curved arms to define an arched opening sized to engage a mounting post. Preferably, the detent protrudes from the side wall in the arched opening between the first and second curved arms.

In another aspect, a method for storing cable slack includes providing a frame oriented in a vertical first plane, providing a first tray mounted to the frame in a vertical second plane parallel to the first plane, pivoting the first tray relative to the frame within the second plane, and directing a first cable into the first tray.

In another aspect, a fiber management system is provided and includes a vertically oriented first wall and a first tray set. The first tray set includes a first tray mounted on the wall and pivotable in a first plane parallel to the wall about a first pivot axis, and a second tray mounted on the wall and pivotable in a second plane parallel to the wall about the first pivot axis.

BRIEF DESCRIPTION OF THE DRAWINGS

FIG. 5 is a left elevational view of an alternate embodiment of a riser analogous to the view shown in FIG. 3.

FIG. 6 is a right elevational view of the alternate embodiment of the riser depicted in FIG. 5, the view being analogous to that shown in FIG. 4.

FIG. 7 is a left elevational view of another embodiment of a riser, the view being analogous to that shown in FIGS. 3 and 5, but not showing cables loaded thereon.

FIG. 8 is a right elevational view of the alternative embodiment depicted in FIG. 7, the view in FIG. 8 being analogous to that depicted in FIGS. 4 and 6 and not showing cables loaded thereon.

FIG. 9 is a perspective view of a portion of the fiber management system in any of FIGS. 1–8, and depicting a storage tray set pivoted from the riser.

FIG. 10 is a perspective view of one embodiment of a post utilized in the embodiment of FIGS. 1–9 for pivotally attaching a storage tray to a riser.

DETAILED DESCRIPTION

Figure 1:
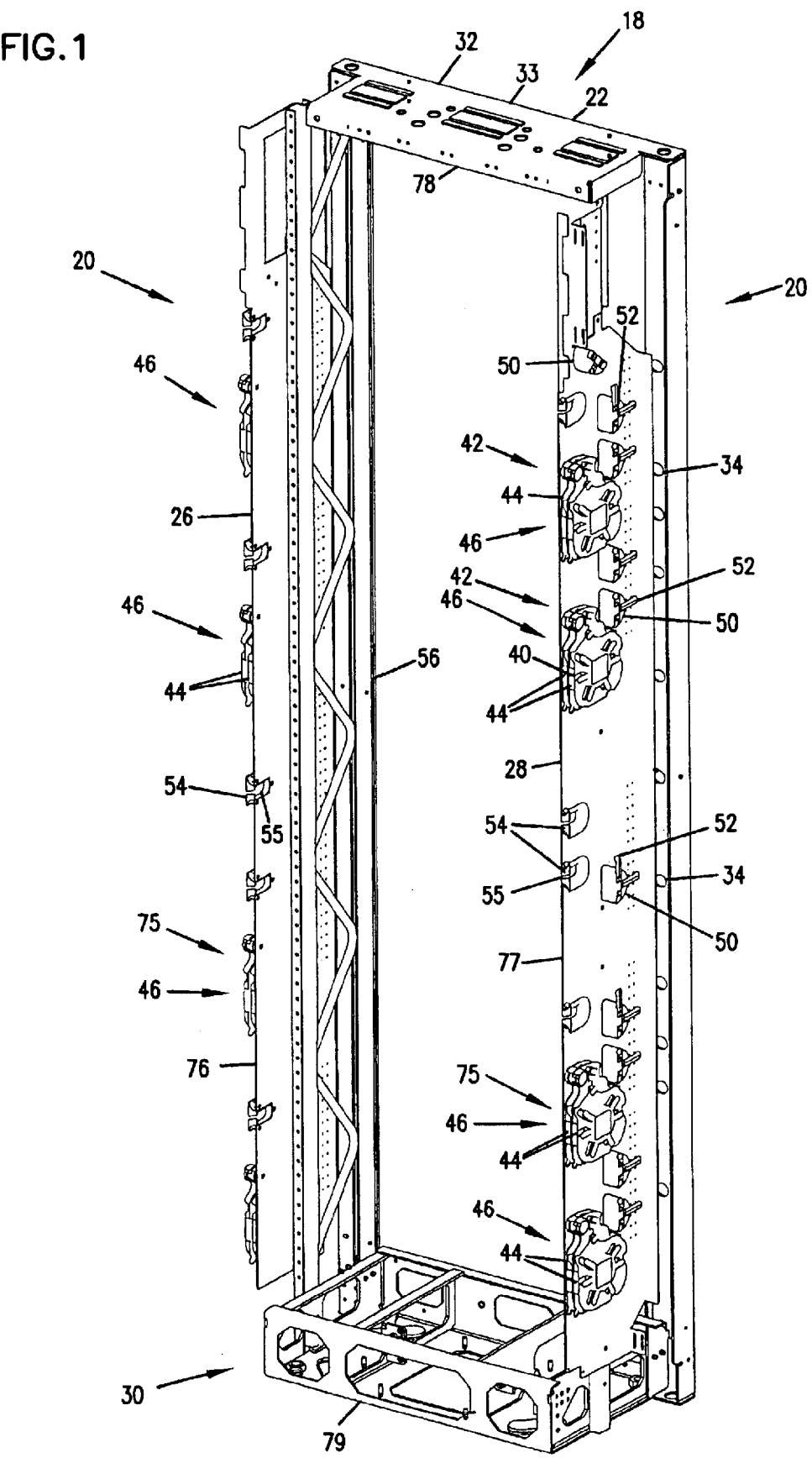
FIG. 1 is a front perspective view of one embodiment of a frame including a fiber management system, constructed according to principles of this disclosure.

FIG. 1 depicts a fiber management system 18 incorporating a storage tray arrangement 20. In preferred uses, the storage tray arrangement 20 is utilized for routing fiber optic cables and storing the cable slack. In typical uses, fiber optic cable is supplied in standard, preset lengths. When routing cables between equipment, these preset lengths are often much longer than what is needed. The storage tray arrangement 20 helps to organize and neatly store the cable slack. The term "cable slack" as used herein means the cable length that is greater than the minimum length needed to connect between two connection points.

The particular fiber management system 18 depicted in FIG. 1 includes a frame 22. The frame 22 is used to hold and store equipment, such as an optical transmission bay with panels or chassis (not shown). In general, the frame 22 includes a first frame section, (or riser) 26 and a second frame section (or riser) 28. A base piece 30 rests upon the ground or the horizontal support surface. The first and second frame sections 26, 28 are perpendicular to and extend from the base piece 30 up to an end piece 32. The end piece 32, in the particular orientation shown in FIG. 1, also corresponds to a top member 33. In general, each of the first frame section 26, second frame section 28, base piece 30, and end piece 32 are constructed of sheet metal, but could be constructed of a variety of materials. As can also be seen in FIG. 1, the frame 22 includes a plurality of mounting holes 34 to receive suitable fasteners in order to fixedly secure the frame 22 to a fixed surface, such as a wall.

As can also be appreciated from viewing FIG. 1, the frame sections 26, 28 are oriented to rest on the base piece 30, which will generally rest on a horizontal, ground surface or floor. The first and second frame sections 26, 28 extend in a vertically oriented plane, that is, a plane that is perpendicular to the floor or ground.

The storage tray arrangement 20 includes at least a first tray 40 that is mounted to the frame 22 in a vertically directed plane, preferably parallel to the plane of the first and second risers 26, 28. Also, in preferred embodiments, a mounting construction 42 is utilized to pivotably secure the first tray 40 to the frame 22 (in particular, to the second frame section 28). Attention is directed to FIG. 9. An example of a tray 44 is shown pivoted relative to the frame 22 within the plane that is parallel to the vertically oriented plane of the frame 22.

In preferred embodiments, the storage tray arrangement 20 will include a plurality of trays 44, each oriented on the frame 22, and within a vertical plane that is parallel to the respective first or second frame section 26, 28. As can also be seen in FIG. 1, in the particular preferred embodiment illustrated, the trays 44 are preferably arranged in a plurality of tray sets 46. Each tray set 46 includes at least two individual trays 44 stacked next to each other in parallel, vertical planes that are parallel to the vertically oriented sections of the frame 22. In preferred embodiments, each tray 44 in each individual tray set 46 shares a common mounting construction 42 and pivots about the same point. This is discussed further below.

As can also be seen from a review of FIG. 1, in many preferred embodiments, the fiber management system 18 includes a plurality of radius limiters 50 and cable tabs 52. The radius limiters 50 help to route the cables and limit the bend of the fibers. The tabs 52 help to hold down and secure the cables in their desired location.

Fiber management system 18 also preferably includes a plurality of grommets 54. The grommets 54 are accommodated in apertures 55 defined by the respective first and second frame sections 26, 28. The grommets 54 provide for a smooth, radius limiter for the cables, such that the cables can be directed from along the first and second frame sections 26, 28 and through the grommets 54 into the interior 56 of the frame 22. As mentioned above, the interior 56 of the frame 22 may hold equipment, such as fiber optic equipment.

Figure 2:
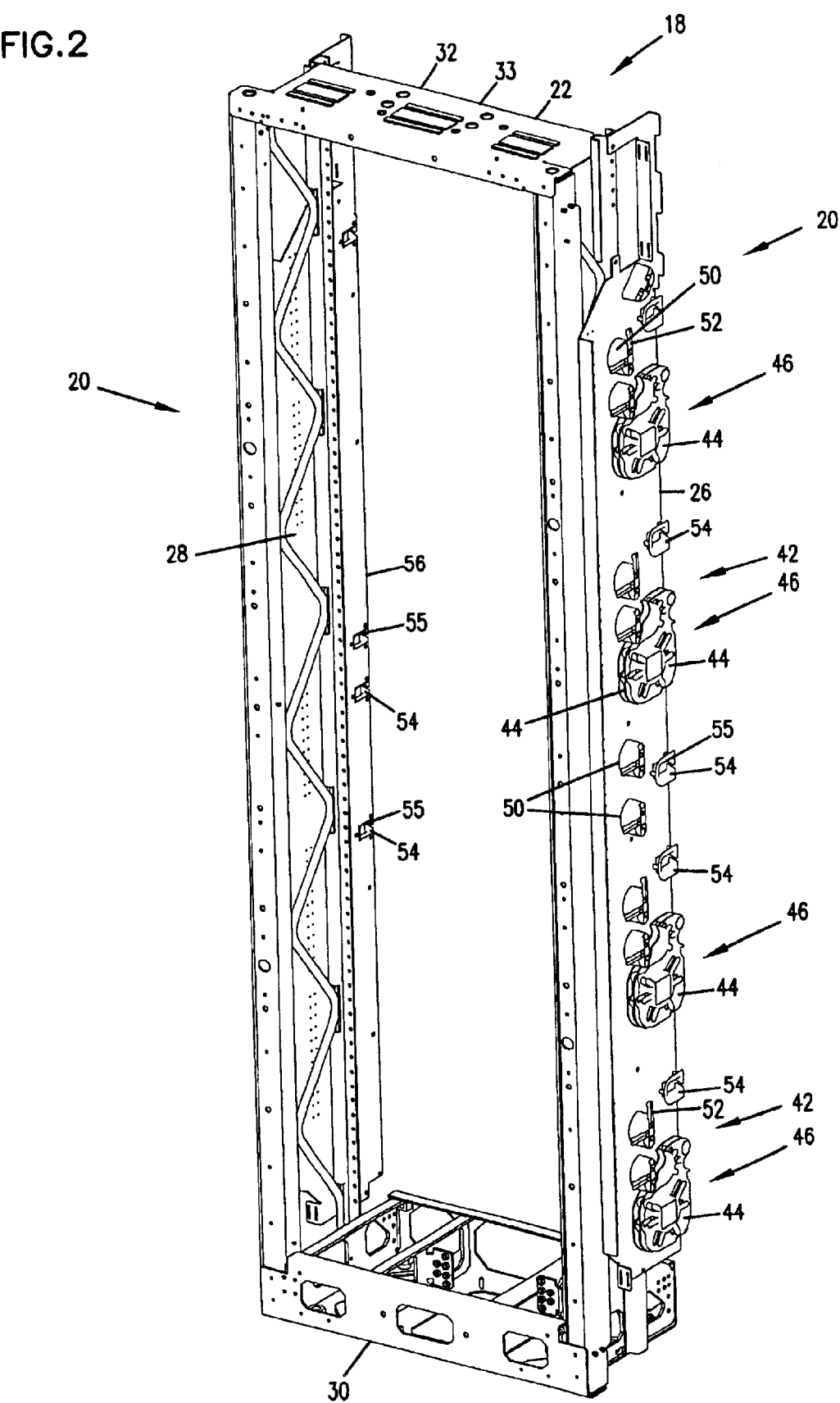
FIG. 2 is a rear perspective view of the embodiment depicted in FIG. 1.

FIG. 2 is a rear perspective view of the fiber management system shown in FIG. 1. This view is shown from the opposite side, such that the first frame section 26 is fully visible. As can be seen from a review of FIG. 2, the first frame section 26 preferably includes the same features shown on the second frame section 28 in FIG. 1. This includes a plurality of tray sets 46, trays 44, mounting constructions 42, radius limiters 50, tabs 52, and grommets 54.

Figure 3:
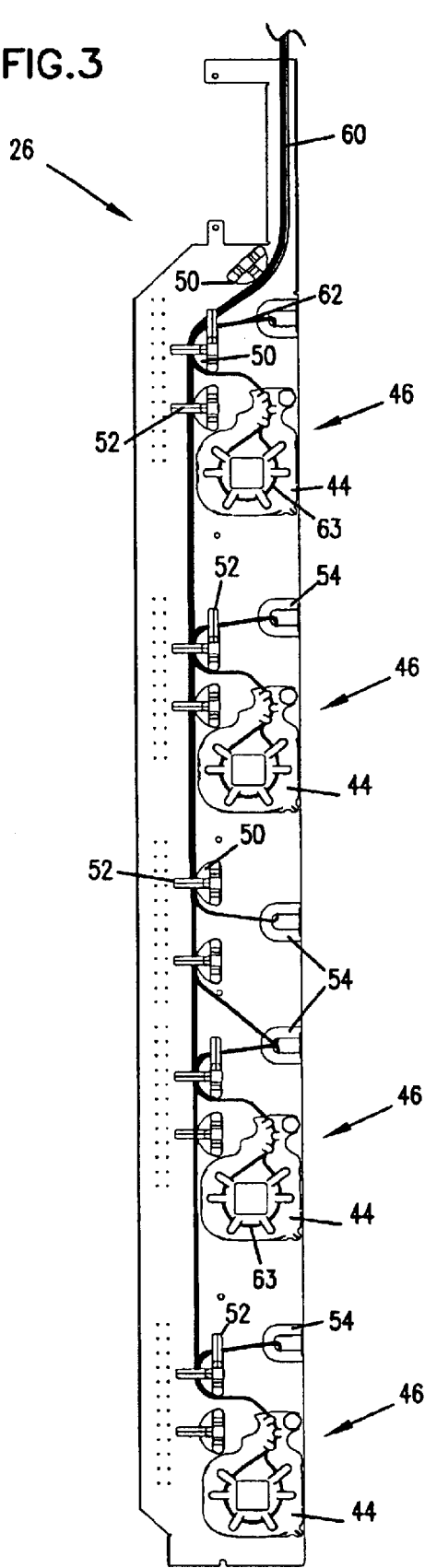
FIG. 3 is a left elevational view of a riser used in the frame depicted in FIG. 1, and showing optical fibers loaded thereon.

FIG. 3 illustrates a side elevational view of the first frame section 26 and loaded with a fiber optic cable bundle 60. In the particular embodiment shown in FIG. 3, the cable bundle 60 is directed from a region overhead of the frame 22. In the embodiment of FIGS. 5 and 6, it is demonstrated how cables 60 can be directed from the floor as well. It can be seen in FIG. 3 how the cable bundle 60 is routed against the first frame section 26 and between various radius limiters 50. The cables 60 are generally in a bundle of several individual cables. Various ones of the individual cables 62 are separated from the cable bundle 60 and directed into the frame interior 56 through the grommet 54 to be connected with pieces of equipment. In many instances, before the individual cable 62 is directed into the frame interior 56, the cable 62 is directed into a tray 44, which stores cable slack as a loop 63 within the tray 44. The loop 63 may include several windings of the cable 62. The individual cable 62 is directed out of the tray 44 and around a radius limiter 50, and through a grommet 54 to be connected with a piece of equipment.

Figure 4:
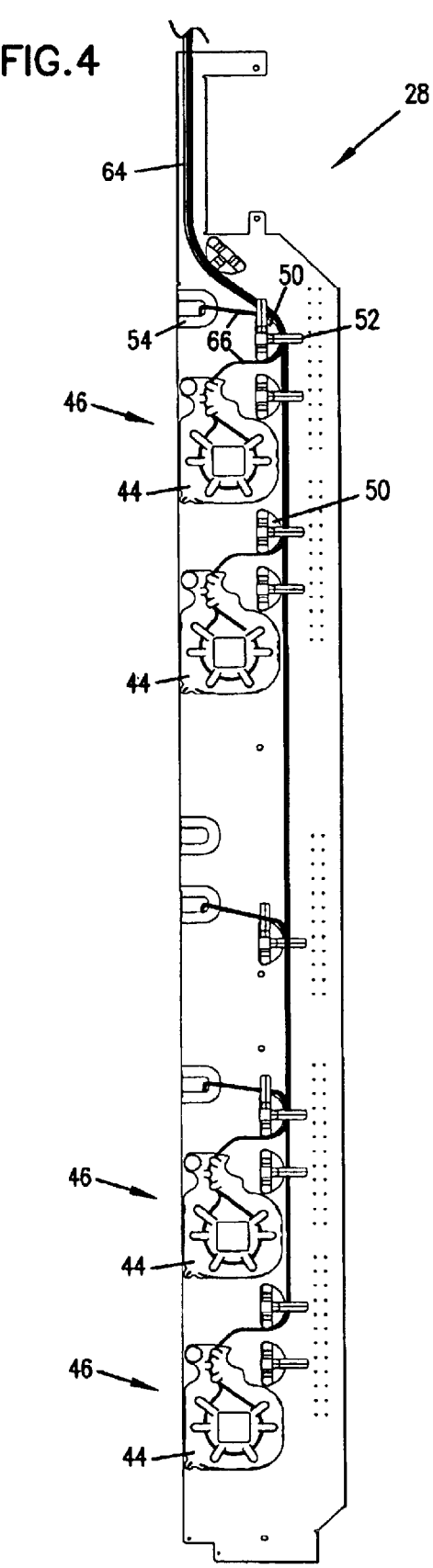
FIG. 4 is a right elevational view of the riser depicted in FIG. 1 and showing optical fibers loaded thereon.

FIG. 4 shows an analogous arrangement as the arrangement shown in FIG. 3. FIG. 4 shows the second frame piece 28 loaded with a cable bundle 64. It can be seen how the cable bundle 64 is directed from a region overhead and against the second frame section 28 of the frame 22. Individual cables 66 are directed into storage trays 44, where cable slack is stored. The individual cable 66 is directed from the tray 44, around radius limiter 50 and into the frame interior 56 through a grommet 54.

Attention is next directed to FIGS. 5 and 6. FIGS. 5 and 6 illustrate an alternate embodiment. In FIGS. 5 and 6, the storage tray arrangement 20 is shown in a configuration of tray sets 46 different from the configuration shown in FIGS. 3 and 4. As can also be seen in FIGS. 5 and 6, the cable bundle 68 is shown directed from a region below the frame 70. In the embodiment of FIGS. 5 and 6, the cable bundle 68 is directed from the floor.

FIGS. 7 and 8 show another alternate embodiment of a storage tray arrangement 20. In the embodiment of FIGS. 7 and 8, the cables are not shown loaded onto the storage tray arrangement 20. FIGS. 7 and 8 illustrate how the tray sets 46, radius limiters 50, and grommets 54 can be arranged in alternate patterns, depending upon the application. It should be understood that a wide variety of arrangements of trays 40, radius limiters 50, grommets 54, and other pieces may be utilized, depending upon the desired features. The embodiments of FIGS. 1–8 are some of the examples possible.

In preferred applications, the fiber management system 18 will include a plurality of frame sections (risers) 26, 28 arranged in a side-by-side relationship. As a result, access to the storage tray arrangement 20 is limited. This is because when the risers 26, 28 are positioned immediately adjacent to each other, the access area to the storage tray arrangement 20 is blocked by the adjacent riser 26, 28. Thus, in the preferred embodiment, the storage tray arrangement 20 includes a pivot system 75. The pivot system 75 allows each of the trays 44 in each of the tray sets 46 to be pivoted or rotated to a region in space that is accessible to the service operator. In FIG. 1, the fiber management system 18 is shown in a front, perspective view. The pivot system 75 allows each of the trays 44 to be pivoted or moved into a region in space that is in front of the front plane defined by front edges 76, 77, 78, and 79. As mentioned above, the pivoting is constrained to a vertical plane that is parallel to the vertical orientation of the first and second frame sections 26, 28 of the frame 22. By being able to pivot into the region in front of the front plane of the fiber management system 18, the user is able to access the cables and manipulate the slack.

Figure 11:
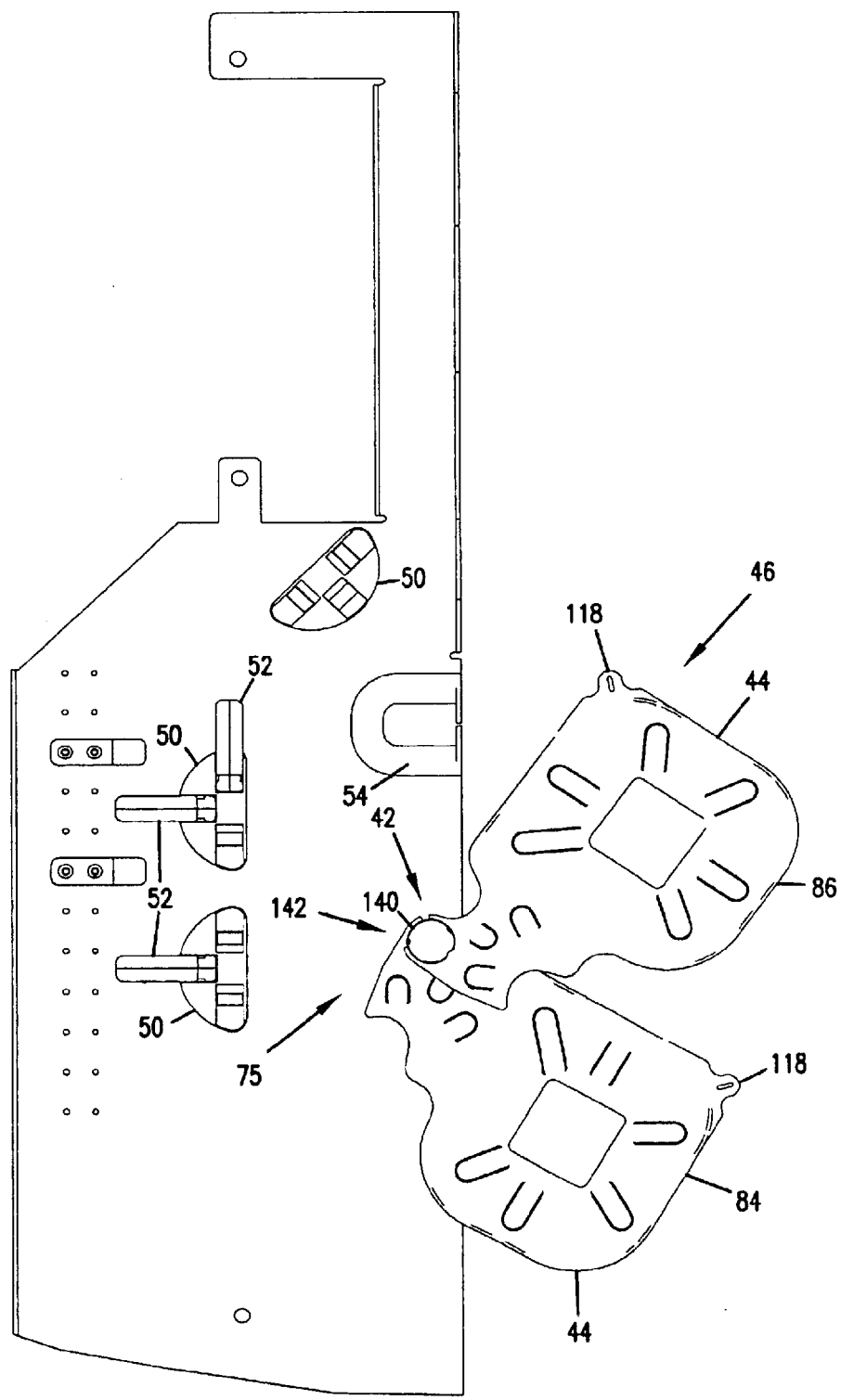
FIG. 11 is a front elevational view of the embodiment depicted in FIG. 9.

FIGS. 9 and 11 show trays 44 of one of the tray sets 46 pivoted out to their service positions. In FIGS. 9 and 11, the tray 44 that is immediately adjacent to the frame piece 82 is designated tray 84, while the tray 44 that is outside of the tray 84 is designated as tray 86. Tray 86 lies over tray 84, when the tray set 46 is in its storage position as shown in FIGS. 1–8. In preferred embodiments, the pivot system 75 will permit one of the trays 84, 86 to pivot at an angle greater than the other tray 84, 86. By permitting one of the trays 84, 86 to pivot farther and limit pivoting of the other tray 84, 86, it ensures that both of the trays 84, 86 are accessible to the user at the same time. In some embodiments, in order to access the lower tray 84, the outside tray 86 will usually have to be pivoted out to a service position.

Details of one particular preferred pivot system 75 are described below. In general, however, it has been found useful to have the outside tray 86 pivot or flip out to an angle of up to 180 degrees and preferably no greater than 160 degrees relative to the initial, storage position illustrated in FIGS. 1–8. Also, preferably, it has been found useful to have the inner tray 84 pivot to an angle no greater than 90 degrees, preferably no greater than 60 degrees relative to the first, initial position illustrated in FIGS. 1–8. FIGS. 9 and 11 show the outer tray 86 pivoted to an angle of 160 degrees and the inner tray 84 pivoted to an angle of 60 degrees relative to their storage position. Before more details of the particular, preferred pivot system 75 is described, details of particular, preferred trays 44 are described.

Figure 12:
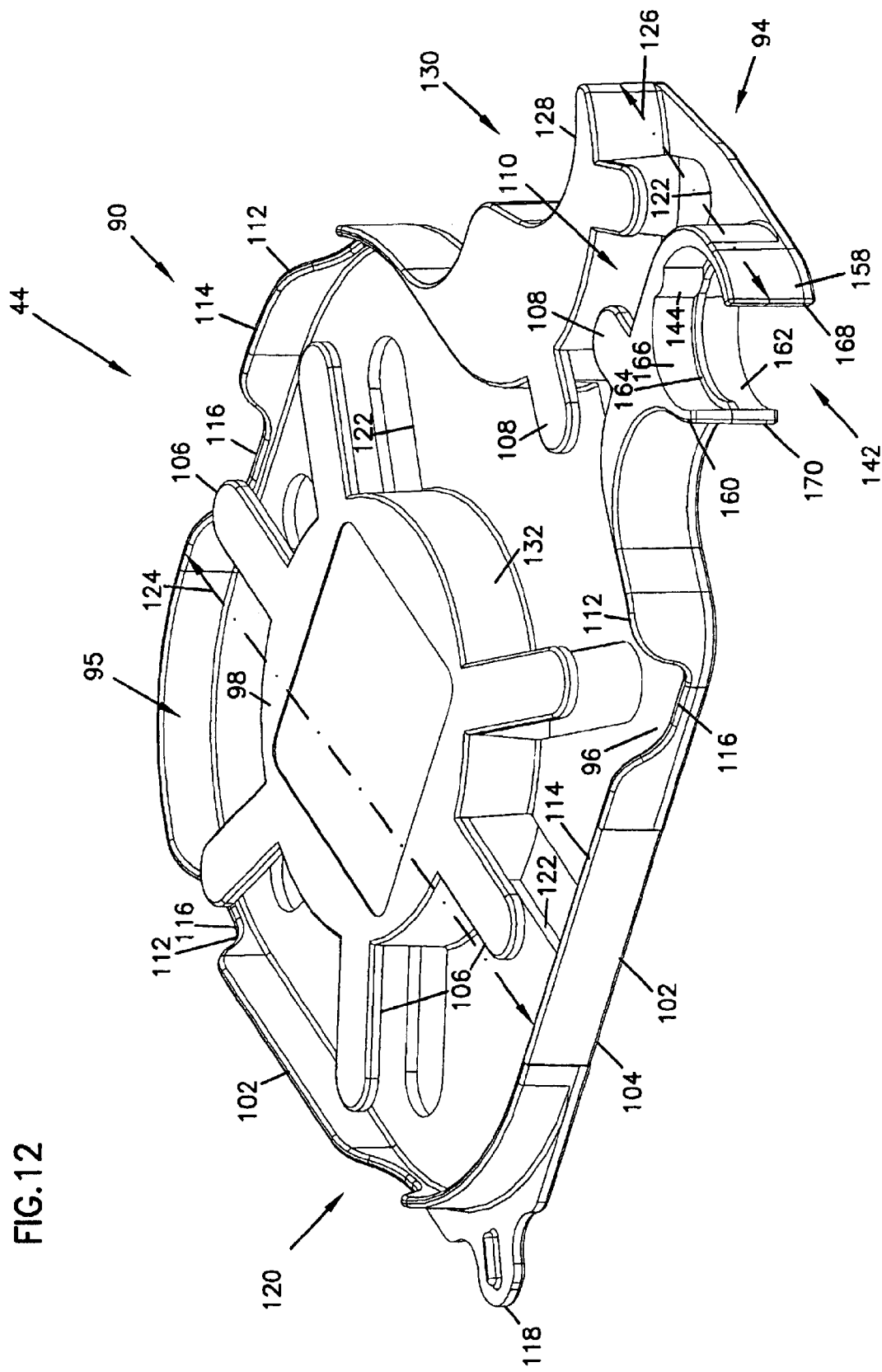
FIG. 12 is a perspective view of a left-hand embodiment of a storage tray that can be used in any of the arrangements shown in FIGS. 1–9.
Figure 13:
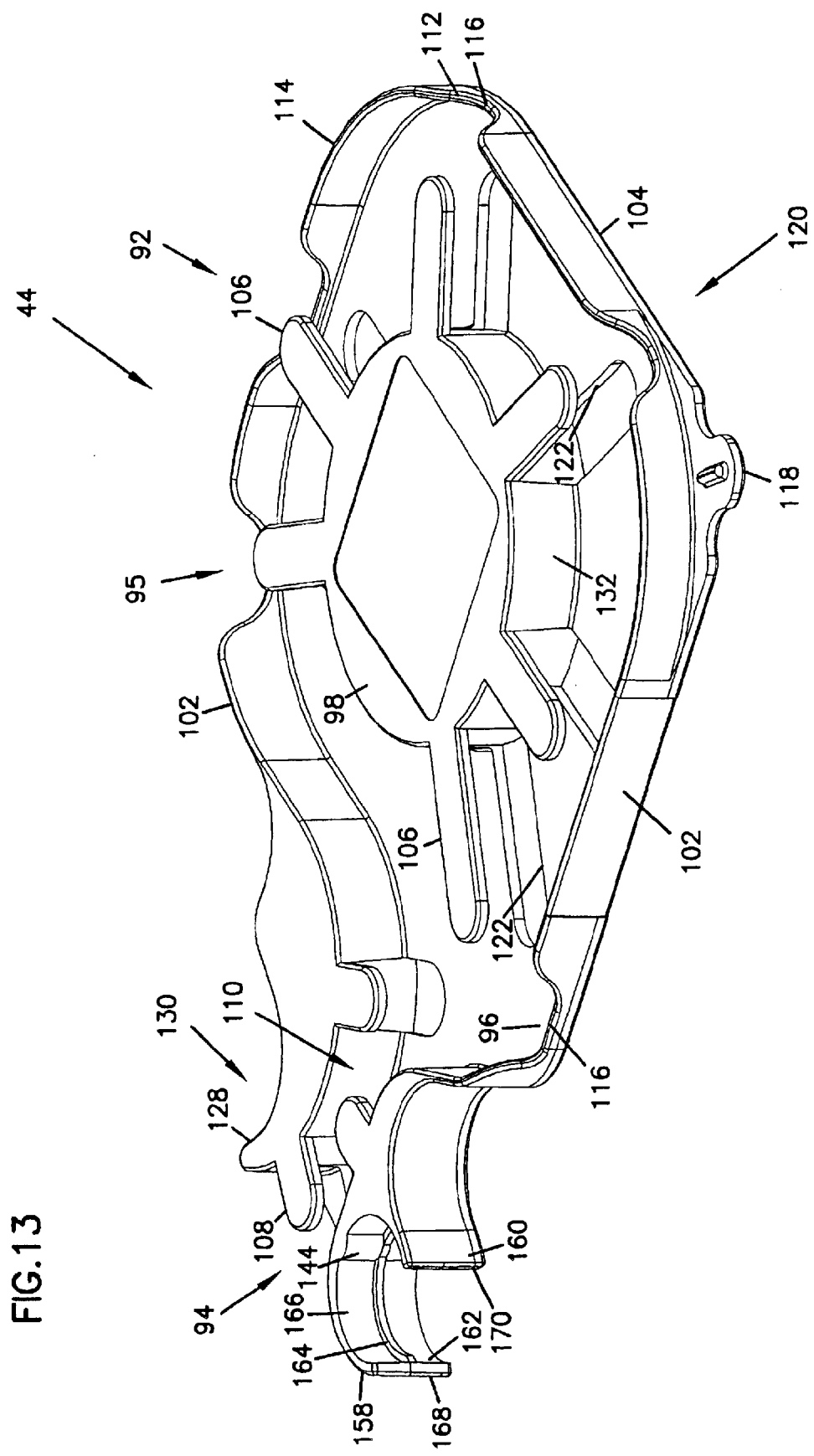
FIG. 13 is a perspective view of a right-hand embodiment of a storage tray that can be used in any of the arrangements of FIGS. 1–8.

Attention is directed to FIGS. 12 and 13. FIGS. 12 and 13 show trays 44. In FIG. 12 is an illustration of a left-handed tray 90, and FIG. 13 is an illustration of a right-handed tray 92. In the particular preferred embodiment illustrated, the left-handed tray 90 and the right-handed tray 92 are mirror-images of each other.

The left-handed tray 90 is mountable on the left side of the frame 22, which in the illustration of FIG. 1, is the first frame section 26. Analogously, the right-handed tray 92 is mountable on the right side of the frame 22, which corresponds to the second frame section 28 in the embodiment of FIG. 1. For the description of the trays 90, 92, the same reference numerals will be used for the same features. As mentioned above, the only difference between the trays 90 and 92 is that they are a mirror image of each other. In other embodiments, the trays 90 and 92 may be designed to be completely symmetrical and identical in appearance, such that they are interchangeable between the right side and left side.

In the preferred embodiment illustrated, the tray 44 generally includes a cable entry region 94, a cable storage region 95, a floor or base 96, and a spool 98 projecting from the base 96. Also, in preferred embodiments, the trays 44 include a side wall 102 extending from the base 96. In preferred embodiments, the base 96 defines an outer perimeter 104, and the side wall 102 extends along at least a portion, and preferably all of the perimeter 104 of the base 96. As can be seen in FIGS. 12 and 13, in the particular preferred embodiment illustrated, the tray 44 includes a first plurality of tabs 106 projecting from the spool 98 and toward the side wall 102. There is also a second plurality of tabs 108 that project from the side wall 102 and over a curved trough 110 of the cable entry region 94.

Also, in many preferred embodiments, the side wall 102 includes a plurality of scallops 112. The scallops 112 take the form of a plurality of peaks 114 and valleys 116. Preferably, the valleys 116 correspond to and extend directly across from one of the first plurality of tabs 106. This is to allow for easier manipulation of the cable slack under the tabs 106 and around the spool 98.

Preferably, the tray 44 includes a projection tab 118 extending from the base 96 at an end 120 of the tray 44 opposite from the cable entry region 94. The projection tab 118 preferably is easily accessible to a user when the tray sets 46 are in their storage positions (FIGS. 1–8) such that the projection tab 118 can be grasped or otherwise engaged in a manner to permit pivoting of the trays 44.

In preferred embodiments, the trays 44 are made by molding techniques. As such, the regions of the tray 44 underneath each of the tabs 106, 108 is an aperture 122. The apertures 122 result from the particular way in which the trays 44 are molded.

The storage region 95 of the tray 44 defines, in general, a width 124. The cable entry region 94 defines a width 126. It can be seen in FIG. 12 that the width 124 is greater than the width 126 of the cable entry region. In many preferred embodiments, the width 126 of the cable entry region is not greater than 50 percent of the width 124 of the storage region 95. In this manner, the cable entry region 94 defines a neck 128.

Adjacent to the neck 128, but not part of the cable storage region 95, is a cut-out area 130 defined by the side wall 102. The cut-out area 130 is provided to ensure that each tray 84, 86 in any given tray set 46 is fully accessible. That is, the cut-out area 130 helps to open up access to the adjacent tray 44 in each tray set 46.

From the foregoing description, it should now be apparent how the trays 44 are utilized to store cable slack. The cable enters and exits the tray 44 at the cable entry region 94. The tabs 108 help to hold the cables in place within the cable entry region 94. In this particular embodiment, there are three tabs 108. The side wall 102 and the base 96 define the curved trough 110 in the cable entry region 94 that ensure that the cables are not bent too sharply. The cable slack is wrapped around the spool 98, and against a wall 132 of the spool 98. The cable slack may be wrapped around the spool 98 several times, however much being necessary. The tabs 106 help to hold the cable slack in place around and against the spool 98. In the embodiments shown in FIGS. 12, 13, there are six tabs 106 spaced apart from each other. The valleys 116 in the scalloped side wall 102 helps to permit easier manipulation of the cable slack under the tabs 106 and around the spool 98.

The preferred pivot system 75 is now described in further detail. The pivot system 75 preferably includes the mounting construction 42 as mentioned above. The mounting construction 42 pivotally secures each of the trays 44 to the frame 22. The mounting construction 42 permits the trays 44 to be selectively pivoted relative to the frame 22 within a vertical plane parallel to the vertical plane of the frame 22. In preferred embodiments, the mounting construction 42 includes a post 140 secured to the frame 22. Each of the trays 44 is pivotally mounted on a respective post 140. In preferred embodiments, the mounting construction 42 permits the trays 44 to be selectively pivotally mounted relative to the post 140 in a plurality of fixed, discrete positions. That is, in preferred embodiments, each of the trays 44 is permitted to pivot and be fixed in a limited number of positions relative to the post 140. In one implementation, this is done through a detent-recess arrangement 142.

Preferably, the detent-recess arrangement includes at least one of the tray 44 and the post 140 as having a detent 144, and the other of the tray 44 and the post 140 as having a plurality of recesses 146. In the particular embodiment illustrated, the detent 144 is shown on the tray 44, while the plurality of recesses 146 is shown on the post 140.

In FIG. 10, the post 140 is shown enlarged, in perspective view. In general, the post 140 includes a cylindrical wall 148 that defines the plurality of recesses 146. It can also be seen that the post 140 has a square mounting boss 150, which accepts a screw through a hole 152. The square shape to the boss 150 ensures that when the trays 44 are rotated relative to the post 140, the post 140 stays fixed relative to the frame 22 and does not rotate. In alternate embodiments, the boss 150 may be eliminated and replaced with other mounting features, such as a pair of holes to accommodate fasteners.

Still in reference to FIG. 10, it can be seen that the post 140 also includes a pair of receiving grooves 154, 156. The grooves 154, 156 are arranged in the post 140 to be in a radial pattern. That is, the grooves 154, 156 form a continuous circle in the outer wall 148. The direction of the grooves 154, 156 are perpendicular to the direction of the recesses 146.

Attention is directed back to FIGS. 12 and 13. In the preferred embodiment, the side wall 102 of the tray 44 includes first and second curved arms 158, 160 defining an arched opening 162 between the first and second curved arms 158, 160. The first and second curved arms 158, 160 are sized relative to the post 140 to extend around and slidably engage the cylindrical wall 148 of the post 140.

As can also be seen in FIGS. 12 and 13, the first and second curved arms 158, 160 include a projecting lip 164 that extends from the wall 166 of the arched opening 162. Each of the curved arms 158, 160 defines an end point 168, 170, and the lip 164 extends across and along the arched opening 162 between each of the end points 168, 170. The detent 144 preferably projects from the wall 166 of the arched opening 162, and preferably, symmetrically in the middle of the first and second arms 158, 160.

In operation, the first and second arms 158, 160 elastically flex to permit the tray 44 to be snapped around the post 140. The groove 154 receives the lip 164 of the inner tray 84, while the groove 156 receives the lip 164 of the outer tray 86. The trays 44 are allowed to pivot relative to the post 140 by the lip 164 sliding within a respective groove 154, 156. When the detent 144 matches up with one of the recesses 146, the tray 44 is fixed in one of its discrete pivot locations. The tray 44 can be dislodged by applying a force to the tray 44 and further sliding the lip 164 within the respective groove 154, 156 until the detent 144 engages and fits within another of the recesses 146.

From a review of FIG. 10, it should be apparent that the recesses 146 in the post 140 can be arranged to control the number of and locations of the discrete pivot points. In the particular one shown in FIG. 10, the post 140 has fewer recesses 146 for the outer tray 86 to engage than the number of recesses 146 for the inner tray 84 to engage. It should be appreciated that the detents and recesses 144, 146 may be reversed. That is, the post 140 could contain the detent, while the tray 44 could contain the recesses. The post 140 is configured with the recesses 146 such that it is usable with both the left side 26 and the right side 28 of the riser 22.

In operation, the fiber management system 18 can be used to store cable slack. The method includes providing the frame 22 and orienting the frame 22 in a vertical plane. The tray 44 is mounted to the frame 22 in a vertical plane that is parallel to the vertical plane of the frame 22. The tray 44 is pivoted relative to the frame 22 within its plane, and cable 60 may be directed into the tray 44.

The cable 60 is directed through the cable entry region 94, wound around the spool 98 once or several times to form cable loop 63, and directed out of the tray 44 through the cable entry region 94. From there, the cable 60 can be directed around radius limiters 50 and to downstream equipment.

In preferred methods, the trays 44 are mounted in a set having two trays, inner tray 84 and outer tray 86. Each of the trays 84, 86 is mounted in a vertical plane parallel to the vertical plane of the frame 22. Each of the inner tray 84 and outer tray 86 is mounted to pivot in a plane parallel to each other and to the plane of the frame 22. Also, preferably, the trays 84, 86 pivot about a common pivot point or pivot post 140.

In preferred methods, the outer tray 86 will be pivoted at an angle of 100–180 degrees relative to the storage position, while the inner tray 84 will be pivoted no more than 90 degrees relative to the initial storage position. Preferably, cable will be directed into both of the inner tray 84 and the outer tray 86.

The fiber management system 18 can be used to store and protect copper-based cables and other cables, in addition to the above noted fiber optic cables.

The above specification, examples and data provide a complete description of the manufacture and use of the invention. Many embodiments can be made.

What is claimed is:

1. A storage tray arrangement for storing cable slack; the tray arrangement comprising:
   (a) a frame; the frame being oriented in a vertical first plane;
   (b) a first tray mounted to said frame in a vertical second plane parallel to the first plane;
      (i) said first tray including a cable entry region; a base; and a spool projecting from said base; and
   (c) a mounting construction pivotably securing said first tray to said frame;
      (i) said mounting construction permitting said first tray to be selectively pivoted relative to said frame within the second plane, and including:
         (A) a post secured to said frame, said first tray being pivotably mounted on said post; and
         (B) a detent-recess arrangement configured to permit said first tray to be selectively pivotably mounted relative to said post in a plurality of discrete positions, said detent-recess arrangement including at least one of said first tray and said post having a detent and the other of said first tray and said post having a plurality of recesses.

2. A tray arrangement according to claim 1 wherein:
   (a) said first tray further includes a sidewall extending from said base;
      (i) said sidewall extending along at least a portion of a perimeter of said base.

3. A tray arrangement according to claim 2 wherein:
   (a) said sidewall of said first tray includes a plurality of scallops.

4. A tray arrangement according to claim 3 wherein:
   (a) said first tray further includes a first plurality of tabs projecting from said spool toward said sidewall.

5. A tray arrangement according to claim 4 wherein:
   (a) said cable entry region of said first tray includes a curved trough adjacent to said sidewall.

6. A tray arrangement according to claim 5 wherein:
   (a) said first tray further includes a second plurality of tabs projecting from said sidewall and over said curved trough of said cable entry region.

7. A tray arrangement according to claim 1 wherein:
(a) said post has a cylindrical wall defining said plurality of recesses;
(b) said sidewall of said first tray includes first and second curved arms to define an arched opening;
   (i) said detent protruding from said sidewall in said arched opening between said first and second curved arms; and
   (ii) said first and second curved arms extending around and slidably engaging said cylindrical wall.

8. A tray arrangement according to claim 7 wherein:
(a) said first and second curved arms includes a projecting lip along said arched opening; and
(b) said cylindrical wall defines a receiving groove slidably receiving said projecting lip.

9. A tray arrangement according to claim 1 further including:
(a) a second tray mounted to said frame in a third plane parallel to the first plane and the second plane;
   (i) said second tray including a second tray cable entry region; a second tray base; and a second tray spool projecting from said second tray base.

10. A tray arrangement according to claim 9 wherein:
(a) said mounting construction permits said second tray to be selectively pivoted relative to said frame within the third plane.

11. A tray arrangement according to claim 10 wherein:
(a) said second tray is pivotably mounted on said post.

12. A tray arrangement according to claim 11 wherein:
(a) said first tray is pivotable up to 180 degrees relative to a first position; and
(b) said second tray is pivotable no greater than 90 degrees relative to said first position.

13. A tray arrangement according to claim 12 wherein:
(a) said post has a cylindrical wall defining a plurality of recesses;
(b) said first tray includes a first arched opening and a first detent protruding in said first arched opening;
   (i) said cylindrical wall being slidably received within said first arched opening;
   (ii) said first detent being selectively engageable in said plurality of recesses; and
(c) said second tray includes a second arched opening and a second detent protruding in said second arched opening;
   (i) said cylindrical wall being slidably received within said second arched opening;
   (ii) said second detent being selectively engageable in said plurality of recesses.

14. A tray arrangement according to claim 13 wherein:
(a) said first tray further includes a sidewall extending from said base; a first plurality of tabs projecting from said spool toward said sidewall; a curved trough adjacent to said sidewall in said cable entry region; and a second plurality of tabs projecting from said sidewall and over said curved trough of said cable entry region;
   (i) said sidewall extending along at least a portion of a perimeter of said base;
   (ii) said sidewall of said first tray including a plurality of scallops; and
(b) said second tray further includes a second tray sidewall extending from said second tray base; a first plurality of second tray tabs projecting from said second tray spool toward said second tray sidewall; a second tray curved trough adjacent to said second tray sidewall in said second tray cable entry region; and a second plurality of second tray tabs projecting from said second tray sidewall and over said second tray curved trough of said second tray cable entry region;
   (i) said second tray sidewall extending along at least a portion of a perimeter of said second tray base;
   (ii) said second tray sidewall including a plurality of second tray scallops.

15. A tray arrangement according to claim 12 wherein:
(a) said frame is vertically oriented; and the tray arrangement further includes:
(b) a first cable extending along said frame, extending through said cable entry region of said first tray, and being coiled around said spool of said first tray; and
(c) a second cable extending along said frame, extending through said second tray cable entry region, and being coiled around said second tray spool.

16. A tray arrangement according to claim 15 wherein:
(a) said first cable further extends from said spool of said first tray and through an opening defined by said frame; and
(b) said second cable further extends from said second tray spool and through said opening defined by said frame.

17. A storage tray for storing cable slack; the tray comprising:
(a) a base; said base defining a storage region and a cable entry region;
   (i) said storage region defining a first width;
   (ii) said cable entry region defining a second width;
      (A) said second width being no more than 50% of said first width;
(b) a sidewall projecting from said base and extending along a perimeter of said base;
   (i) said sidewall and said base defining a neck having a flared entrance, the neck including a curved trough extending from the storage region toward the flared entrance through said cable entry region, said flared entrance including opposing convex sidewall portions;
   (ii) said sidewall defining a plurality of scallops;
   (iii) said sidewall includes first and second curved arms to define an arched opening;
(c) a spool in said storage region projecting from said base;
(d) a first plurality of tabs extending from said spool toward said sidewall in said storage region;
(e) a second plurality of tabs extending from said sidewall and over said trough in said cable entry region;
(f) a detent protruding from said sidewall in said arched opening between said first and second curved arms; and
(g) a projecting lip along said sidewall of said arched opening.

18. A storage tray according to claim 17 wherein:
(a) said first and second arms are oriented in said cable entry region.

19. A storage tray for storing cable slack; the tray comprising:
(a) a base; said base defining a storage region and a cable entry region;
(b) a sidewall projecting from said base and extending along a perimeter of said base;
   (i) said sidewall and said base defining a curved trough through said cable entry region;

(ii) said sidewall including first and second curved arms to define an arched opening sized to engage a mounting post;

(c) a detent protruding from said sidewall in said arched opening between said first and second curved arms;

(d) a spool in said storage region projecting from said base;

(e) a first plurality of tabs extending from said spool toward said sidewall in said storage region; and (f) a second plurality of tabs extending from said sidewall and over said trough in said cable entry region.

20. A storage tray according to claim 19 wherein:

(a) said sidewall includes a plurality of peaks and valleys; and (b) at least some of said first plurality of tabs extend from said spool toward said sidewall and in alignment with respective valleys.

21. A method for storing cable slack; the method comprising:

(a) providing a frame oriented in a vertical first plane;

(b) providing a first tray mounted to the frame in a vertical second plane parallel to the first plane, the first tray including a mounting construction having a mounting post defining a pivot axis, the mounting post including positioning structure, the positioning structure being configured to selectively and pivotably mount the first tray relative to the frame in a plurality of positions;

(c) pivoting the first tray about the pivot axis of the mounting construction relative to the frame within the second plane and positioning the first tray in a selected one of the plurality of positions; and (d) directing a first cable into the first tray.

22. A method according to claim 21 wherein:

(a) said step of providing a first tray includes providing a first tray having a cable entry region; a base; and a spool projecting from the base; and (b) said step of directing a first cable into the first tray includes directing a first cable into the cable entry region and around the spool of the first tray.

23. A method according to claim 21 further including:

(a) providing a second tray mounted to the frame in a vertical third plane parallel to the first plane and second plane; and (b) pivoting the second tray relative to the frame within the third plane.

24. A method according to claim 23 wherein:

(a) said step of pivoting the second tray relative to the frame within the third plane includes pivoting the second tray about the pivot axis of the mounting construction.

25. A method according to claim 24, wherein:

(a) said step of pivoting the first tray relative to the frame within the second plane includes pivoting the first tray 100–180 degrees relative to a first position; and (b) said step of pivoting the second tray relative to the frame within the third plane includes pivoting the second tray no more than 90 degrees relative to the first position.

26. A method according to claim 24 further including:

(a) directing a second cable into the second tray.

27. A method according to claim 26 wherein:

(a) said step of directing a first cable into the first tray includes directing the first cable vertically along the frame and into the first tray; and (b) said step of directing a second cable into the second tray includes directing the second cable vertically along the frame and into the second tray.

28. A fiber management system comprising:

(a) a vertically oriented wall;

(b) a first tray set including:

(i) a first tray mounted on said wall; said first tray being pivotable in a first plane parallel to said wall about a first pivot axis;

(ii) a second tray mounted on said wall; said second tray being pivotable in a second plane parallel to said wall about said first pivot axis;

(iii) a mounting construction having a mounting post defining a pivot axis, the mounting post including positioning structure, each of the first and second trays being coupled to the mounting construction;

(iv) wherein the first and second trays are configured to selectively engage the positioning structure of the mounting post to pivotably mount the first and second trays relative to the wall at a selected position.

29. A system according to claim 28 wherein:

(a) said wall defines a least one aperture; and the system further includes:

(b) a fiber cable extending vertically along a portion of said wall, in said first tray, and through said aperture.

30. A system according to claim 28 further including:

(a) a plurality of tray sets; each of said tray sets including two trays pivotably mounted on said wall about a common pivot axis; each of the two trays of each tray set being pivotable in a vertical plane parallel to said wall.

* * * * *